United States Patent
Omori

(10) Patent No.: US 8,845,193 B2
(45) Date of Patent: Sep. 30, 2014

(54) RADIAL FOIL BEARING

(71) Applicant: Naomichi Omori, Tokyo (JP)

(72) Inventor: Naomichi Omori, Tokyo (JP)

(73) Assignee: IHI Corporation (JP)

(*) Notice: Subject to any disclaimer, the term of this patent is extended or adjusted under 35 U.S.C. 154(b) by 0 days.

(21) Appl. No.: 14/167,414

(22) Filed: Jan. 29, 2014

(65) Prior Publication Data

US 2014/0147064 A1 May 29, 2014

Related U.S. Application Data

(63) Continuation of application No. PCT/JP2012/067330, filed on Jul. 6, 2012.

(30) Foreign Application Priority Data

Aug. 1, 2011 (JP) ................... 2011-168575

(51) Int. Cl.
 F16C 17/02 (2006.01)
 F16C 35/02 (2006.01)
(52) U.S. Cl.
 CPC .............. *F16C 17/024* (2013.01); *F16C 35/02* (2013.01); *F16C 2360/23* (2013.01); *F16C 2360/44* (2013.01)
 USPC .......................................... 384/103; 384/106
(58) Field of Classification Search
 USPC ................................................ 384/103–106
 See application file for complete search history.

(56) References Cited

U.S. PATENT DOCUMENTS

| | | | | |
|---|---|---|---|---|
| 3,809,443 A * | 5/1974 | Cherubim | | 384/106 |
| 4,552,466 A * | 11/1985 | Warren | | 384/103 |
| 5,634,723 A * | 6/1997 | Agrawal | | 384/106 |
| 8,500,331 B2 * | 8/2013 | Kim et al. | | 384/106 |
| 2002/0097927 A1 * | 7/2002 | Lee et al. | | 384/103 |

FOREIGN PATENT DOCUMENTS

| | | |
|---|---|---|
| JP | 2002-061645 | 2/2002 |
| JP | 2004-270904 | 9/2004 |
| JP | 2006-057652 | 3/2006 |
| JP | 2009-299748 | 12/2009 |
| JP | 2011-017385 | 1/2011 |
| JP | 2011-033176 | 2/2011 |
| JP | 2012-241775 | 12/2012 |
| JP | 2013-024344 | 2/2013 |

OTHER PUBLICATIONS

International Search Report and Written Opinion mailed Sep. 25, 2012 in corresponding PCT International Application No. PCT/JP2012/067330.

* cited by examiner

*Primary Examiner* — Thomas R Hannon
(74) *Attorney, Agent, or Firm* — Ostrolenk Faber LLP

(57) ABSTRACT

The radial foil bearing includes a top foil, a back foil, and a bearing housing accommodating the top and back foils, and supports a rotary shaft. Engagement grooves are formed on both side surfaces of the bearing housing to extend from the outer circumferential edge to the inner circumferential edge of the side surface. Notches are formed in circumferential edges on both sides of the back foil. A locking member is locked into the engagement grooves of the bearing housing and the notches of the back foil, and includes a pair of engagement legs engaging with the engagement grooves and the notches, and a connection portion connecting the engagement legs together to be disposed near one ends of the engagement legs.

8 Claims, 4 Drawing Sheets

RADIAL FOIL BEARING

This application is a Continuation application based on International Application No. PCT/JP2012/067330, filed Jul. 6, 2012, which claims priority on Japanese Patent Application No. 2011-168575, filed Aug. 1, 2011, the contents of both of which are incorporated herein by reference.

TECHNICAL FIELD

The present invention relates to a radial foil bearing.

BACKGROUND ART

In the related art, as a bearing for a high-speed rotating body, a radial bearing, which is used to be externally attached to a rotary shaft, is known. As the radial bearing, a radial foil bearing is well known, which includes a thin sheet-shaped top foil which forms a bearing surface, a back foil which elastically supports the top foil, and a cylindrical bearing housing which accommodates the top foil and the back foil. As the back foil of the radial foil bearing, a bump foil, in which a thin sheet is formed in a wave shape, is mainly used.

In the radial foil bearing, in order to prevent the top foil or the back foil from being detached from the bearing housing, one end (toe portion) of the top foil or the back foil is directly fixed to the bearing housing or is indirectly fixed thereto via a spacer, using spot welding.

Moreover, as a structure to perform a mechanical fixation instead of the fixation using the welding, a structure, in which the end of the top foil or the back foil (bump foil) is bent and the bent portion is engaged with an engagement groove formed in the bearing housing, is also known (for example, refer to Patent Documents 1 to 3).

DOCUMENT OF RELATED ART

Patent Document

[Patent Document 1] Japanese Unexamined Patent Application, First Publication No. 2011-033176
[Patent Document 2] Japanese Unexamined Patent Application, First Publication No. 2011-017385
[Patent Document 3] Japanese Unexamined Patent Application, First Publication No. 2002-061645

SUMMARY OF INVENTION

Technical Problem

However, if the fixation of the back foil (bump foil) to the bearing housing is performed using welding, the back foil or the bearing housing is deformed due to heat input, and the top foil is influenced by the deformation, so that distortion occurs in the top foil. Moreover, even when the structures disclosed in Patent Documents 1 to 3 are used, since the top foil or the back foil is formed by bending, distortion occurs in the top foil. That is, distortion occurs in each of the top foil and the back foil due to the bending of the top foil and the back foil, and the back foil supports the top foil. Accordingly, the distortion of the back foil influences the top foil, and thus, the distortion of the top foil is further increased.

In addition, the thickness of a fluid lubricating film of a foil bearing, which is formed between the rotary shaft and the top foil due to rotation of the rotary shaft, is approximately 10 μm, which is extremely thin. Accordingly, slight distortion occurring in the top foil adversely influences a load capability or dynamic characteristics (rigidity and damping) of the bearing. As a result, a bearing which realizes the designed performance thereof cannot be obtained.

In addition, in order to improve bearing performance of the radial foil bearing, it is effective to divide the back foil into multiple sections in the circumferential direction thereof. However, in this case, the number of fixed points of the back foil with respect to the bearing housing is increased. Accordingly, in the fixation using the welding in the related art, since the welding locations are increased, man-hour is increased and the manufacturing cost rises. Moreover, in a case where the number of welding locations is increased, if all locations to be welded are not favorably welded, the bearing cannot be delivered as a product. Accordingly, quality maintenance becomes difficult, and the manufacturing cost is increased due to a decrease of efficiency percentage at the time of manufacturing.

The present invention is made in consideration of the above-described circumstances, and an object thereof is to provide a radial foil bearing which decreases distortion occurring in a top foil, realizes the designed favorable performance with respect to a load capability or dynamic characteristics (rigidity and damping) of the bearing, and suppresses the manufacturing cost thereof.

Solution to Problem

According to an aspect of the present invention, a radial foil bearing supports a rotary shaft by being externally attached to the rotary shaft. The radial foil bearing includes: a cylindrical top foil disposed so as to face the rotary shaft; a back foil disposed on a radially outer side of the top foil; and a cylindrical bearing housing accommodating the top foil and the back foil in a state of inserting the top foil and the back foil thereinto. Engagement grooves are formed on both side surfaces of the bearing housing so as to extend from an outer circumferential edge to an inner circumferential edge of the bearing housing. Notches are formed in circumferential edges on both sides of the back foil. In addition, a locking member is locked into the engagement grooves of the bearing housing and the notches of the back foil, and includes a pair of engagement legs engaging with the engagement grooves and the notches, and a connection portion connecting the engagement legs together so as to be disposed near one ends of the engagement legs.

In this case, the locking member which includes the pair of engagement legs and the connection portion is used, and each of the pair of engagement legs is engaged with the notch of the back foil and the engagement groove of the bearing housing. Accordingly, the back foil is fixed to the bearing housing. Therefore, the back foil can be accommodated into and fixed to the bearing housing without performing spot welding or bending with respect to the back foil. As a result, occurrence of distortion in the top foil due to the spot welding of the back foil or due to influence of distortion in the back foil can be prevented. Moreover, since welding of the back foil is unnecessary, errors of assembly or variation in assembly due to welding defects can be prevented.

In addition, in the above radial foil bearing, the back foil may be a wave-like sheet in which valley portions contacting the bearing housing and peak portions contacting the top foil are alternately formed in a circumferential direction of the bearing housing, the notches of the back foil may be formed in the valley portions, and the connection portion may be disposed between the top foil and the back foil.

In this case, the back foil contacts the top foil at the peak portions of the back foil. Accordingly, the locking member, which engages with the notches formed in the valley portions of the back foil, is disposed without the connection portion interfering with the top foil.

Moreover, in the above radial foil bearing, the notches of the back foil may be formed in a circumferentially center portion of the back foil.

The back foil elastically supports the top foil. Accordingly, when the back foil receives a load from the top foil, the back foil is deformed in the circumferential direction thereof, and thus, the back foil accepts the flexure of the top foil and supports the top foil. However, when the back foil is deformed in the circumferential direction, the back foil is influenced by friction between the back foil and the bearing housing. Therefore, the back foil is easily deformed at a free end thereof, but is not easily deformed at a fixed end thereof. Accordingly, a difference in supporting rigidity between the free end and the fixed end is caused, and uniform supporting rigidity cannot be obtained over the entire bearing.

Compared to when one end of the back foil is fixed by the locking member, when the notches of the back foil are formed in the circumferentially center portion of the back foil and the fixation using the locking member is performed at the circumferentially center portion of the back foil, a distance between a fixed end (a portion fixed by the locking member) and a free end (an end of the back foil) of the back foil is divided approximately in half, and thus, the difference in supporting rigidity between the free end and the fixed end is decreased.

Moreover, in the above radial foil bearing, the back foil may be configured to include back foil pieces disposed in a circumferential direction of the top foil, the notches may be formed in each of the back foil pieces, and the engagement legs of the locking member may engage with the notches.

In this case, the distance between the fixed end and the free end in the back foil piece is shortened. Accordingly, as described above, the difference in supporting rigidity between the free end and the fixed end is decreased, and variation of the supporting rigidity in the entire back foil is further decreased.

In addition, in the above radial foil bearing, the notches of each back foil piece may be formed in a circumferentially center portion of each back foil piece.

In this case, the difference in supporting rigidity between the free end and the fixed end of each back foil piece is further decreased, and the variation of the supporting rigidity in the entire back foil is further decreased.

Effects of Invention

According to a radial foil bearing of the present invention, occurrence of distortion in the back foil is prevented, and distortion of the top foil is decreased. As a result, a radial foil bearing, which realizes the designed favorable performance with respect to a load capability or dynamic characteristics (rigidity and damping) of the bearing, can be obtained. Moreover, since welding of the back foil becomes unnecessary, errors of assembly or variation in assembly due to welding defects is prevented, and thus the manufacturing cost can be decreased due to improvement of efficiency percentage at the time of manufacturing.

DESCRIPTION OF EMBODIMENTS

Figure 1:
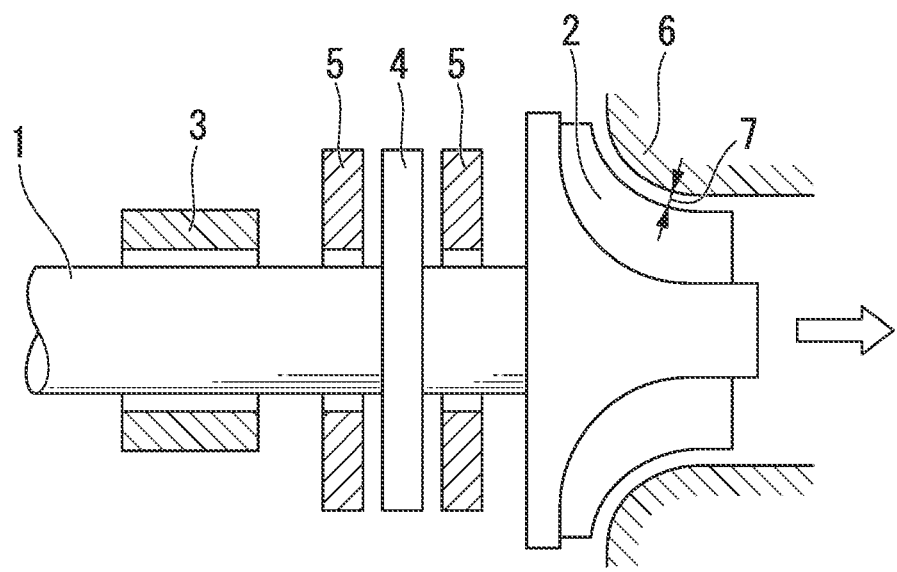
FIG. 1 is a schematic view showing an example of a turbo machine to which a radial foil bearing according to the present invention is applied.

Hereinafter, a radial foil bearing of the present embodiment will be described in detail with reference to the drawings. Moreover, in order to show each member in a recognizable size in the drawings below, the scale of each member is appropriately changed.

FIG. 1 is a side view showing an example of a turbo machine to which the radial foil bearing of the present embodiment is applied. In FIG. 1, a rotary shaft 1, an impeller 2 provided in the tip of the rotary shaft, a radial foil bearing 3, a thrust collar 4, thrust bearings 5, and a housing 6 are shown. Moreover, in FIG. 1, only one radial foil bearing 3 is shown and another radial foil bearing 3 is omitted. However, in general, two radial foil bearings are provided in an axial direction of the rotary shaft 1, and thus, a support structure for the rotary shaft 1 is configured. Accordingly, also in the present embodiment, two radial foil bearings 3 are provided.

In the rotary shaft 1, the thrust collar 4 is fixed to a side on which the impeller 2 is formed. In each of both sides of the thrust collar 4, the thrust bearing 5 is disposed so as to face the thrust collar 4.

Moreover, the impeller 2 is disposed inside the housing 6 which is a stationary side, and a tip clearance 7 is provided between the housing 6 and the impeller 2.

In addition, the radial foil bearing 3 is externally attached to the rotary shaft 1 at a position nearer to the center of the rotary shaft than the thrust collar 4.

Figure 2A:
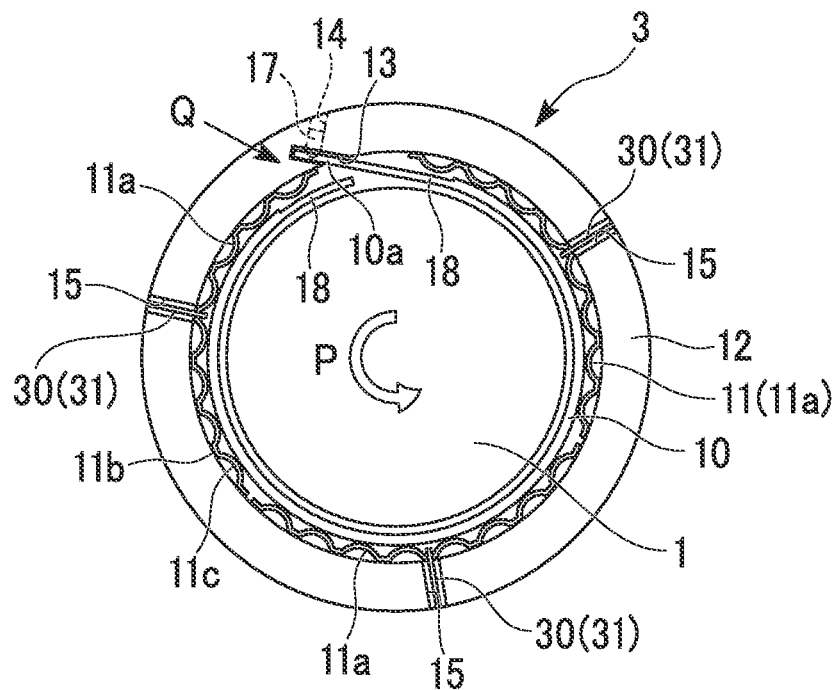
FIG. 2A is a view showing a schematic configuration of an embodiment of the radial foil bearing according to the present invention, and is a side view of the radial foil bearing.

FIGS. 2A to 2E are views showing an embodiment of the radial foil bearing which is applied to the turbo machine having the above-described configuration. As shown in FIG. 2A, the radial foil bearing 3 of the present embodiment is externally attached to the rotary shaft 1, supports the rotary shaft 1, and has a cylindrical shape. The radial foil bearing 3 is configured to include a cylindrical top foil 10 which is disposed so as to face the rotary shaft 1, a back foil 11 which is disposed on the radially outer side of the top foil 10, and a bearing housing 12 which is disposed on the radially outer side of the back foil 11.

The bearing housing 12 composes the outermost portion of the radial foil bearing 3, is formed of a metal, and has a cylindrical shape. The bearing housing 12 accommodates the back foil 11 and the top foil 10 in the inside of the bearing housing. A groove 13 is formed on the inner circumferential surface of the bearing housing 12 in the axial direction of the bearing housing 12.

That is, the groove 13 is formed on the inner circumferential surface of the bearing housing 12 over the entire length in the axial direction of the bearing housing 12. The groove 13 is formed so that the depth direction thereof corresponds to a direction in which one end 10a of the top foil 10 described below extends out. In addition, the depth of the groove 13 is approximately 2 mm to 5 mm.

In addition, a pair of holes 14, which communicate with the groove 13, are formed in a portion near the outer circumferential surface of the bearing housing 12. As to be described below, the holes 14 are used to fix the one end 10a of the top foil 10 which is inserted into the groove 13, into the groove 13. That is, the hole 14 is a hole for inserting a male screw thereinto, and a female threaded portion is formed on the inner circumferential surface of the hole.

Figure 2B:
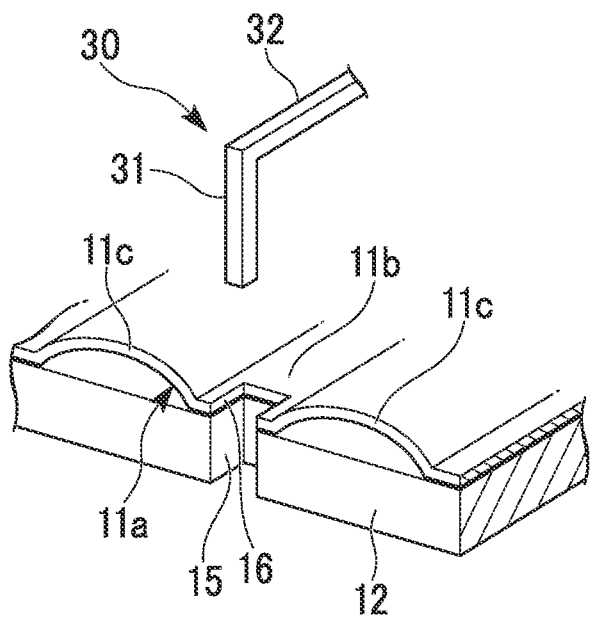
FIG. 2B is a view showing a schematic configuration of the embodiment of the radial foil bearing according to the present invention, and is a perspective view showing a main section of the radial foil bearing.

Moreover, as shown in FIGS. 2A and 2B, three engagement grooves 15, which extend from an outer circumferential edge to an inner circumferential edge of the bearing housing 12, are formed on both side surfaces of the bearing housing 12. As shown in FIG. 2A, the engagement grooves 15 of the present embodiment are formed at positions in which the side surface of the bearing housing 12 are approximately divided into three in the circumferential direction thereof. Locking members 30 described below are locked into the engagement grooves 15. Moreover, in the present embodiment, the groove 13 is disposed between two engagement grooves 15 in three engagement grooves 15.

The back foil 11 is formed of a foil (thin sheet) and elastically supports the top foil 10. As the back foil 11, for example, a bump foil, a spring foil which is described in Japanese Unexamined Patent Application, First Publication No. 2006-57652, Japanese Unexamined Patent Application, First Publication No. 2004-270904, or the like, a back foil which is described in Japanese Unexamined Patent Application, First Publication No. 2009-299748, or the like is used. In the present embodiment, a bump foil is used as the back foil 11. However, the spring foil or the back foil described above may be used as the back foil.

As shown in FIG. 2A, the back foil (bump foil) 11 is configured to include three (a plurality of) back foil pieces 11a which are disposed in the circumferential direction of the top foil 10. In the back foil piece 11a, a foil (thin sheet) is formed in a wave shape, and the entire side surface of the back foil piece is formed to be an approximate arc shape. All three back foil pieces 11a are formed so as to have the same shape and size. Accordingly, the back foil pieces 11a are disposed so as to approximately divide the inner circumferential surface of the bearing housing 12 into three.

Moreover, two back foil pieces 11a are disposed with some gaps at a position in which the groove 13 is interposed therebetween, and at other positions, two back foil pieces 11a are disposed so that the ends thereof are close to each other. According to the above configuration, the three back foil pieces 11a are disposed along the inner circumferential surface of the bearing housing 12 so as to form an approximately cylindrical shape as a whole.

Figure 2C:
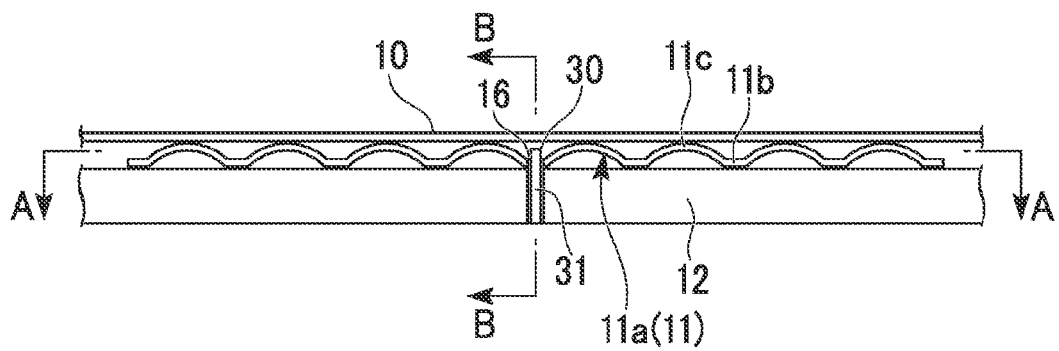
FIG. 2C is a view showing a schematic configuration of the embodiment of the radial foil bearing according to the present invention, and is a side view in which a main section of FIG. 2A is flattened and is schematically shown.

Moreover, as shown in FIG. 2C in which a main section of FIG. 2A is flattened and is schematically shown, in the back foil piece 11a which is formed in a wave shape, flat valley portions 11b contacting the bearing housing 12 and curved peak portions 11c contacting the top foil 10 are alternately formed in the circumferential direction of the bearing housing 12. The back foil pieces 11a elastically support the top foil 10 particularly through the peak portions 11c contacting the top foil 10. Moreover, fluid passages are formed by the peak portions 11c or the valley portions 11b in the axial direction of the radial foil bearing 3.

Figure 2D:
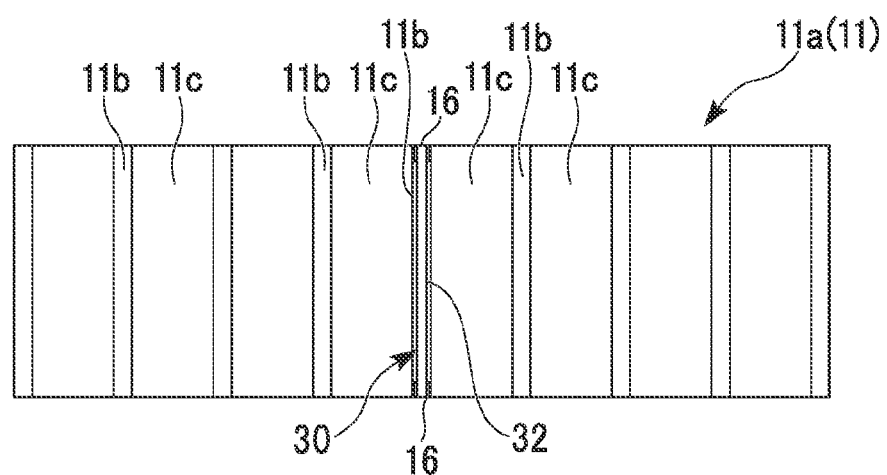
FIG. 2D is a view showing a schematic configuration of the embodiment of the radial foil bearing according to the present invention, and is a cross-sectional view along an A-A line in FIG. 2C.

In addition, as shown in FIG. 2D which is a cross-sectional view along an A-A line in FIG. 2C, notches 16 are formed in circumferential edges on both sides of a circumferentially center portion (the center portion in the circumferential direction of the bearing housing 12) in each of the back foil pieces 11a. As shown in FIG. 2B, the notch 16 is formed in the valley portion 11b of the back foil piece 11a. The valley portion 11b, which is a flat portion formed between the peak portions 11c and 11c, is notched from the side circumferential edge thereof toward the axially center portion of the bearing housing 12, and thus, the notch 16 is formed. The notch 16 is formed at a position corresponding to the engagement groove 15 of the bearing housing 12, that is, a position which overlaps with the engagement groove 15. Moreover, the width and the depth of the notch 16 are formed to be the same as the width and the depth of the engagement groove 15.

According to the above-described configuration, as shown in FIG. 2B, the engagement groove 15 of the bearing housing 12 and the notch 16 of the back foil piece 11a function as one groove. Moreover, in order to prevent occurrence of burr, stress, and distortion in the foil, it is preferable that the notch 16 be formed in the foil using etching processing or electro discharge machining. That is, after the notch 16 is formed in the foil using the etching processing or electro discharge machining, it is preferable that the back foil piece 11a be formed by performing press molding on the foil to form peak portions 11c and valley portions 11b.

Figure 2E:
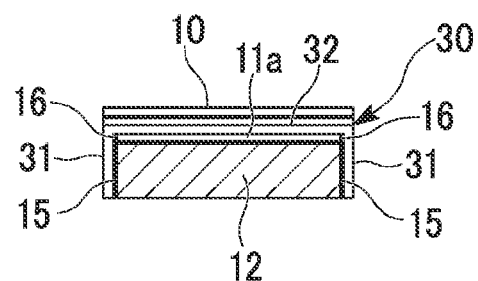
FIG. 2E is a view showing a schematic configuration of the embodiment of the radial foil bearing according to the present invention, and is a cross-sectional view along a B-B line in FIG. 2C.

The locking member 30 is locked into the engagement grooves 15 and the notches 16. As shown in FIG. 2E which is a cross-sectional view along a B-B line of FIG. 2C and in FIG. 2B, the locking member 30 includes a pair of engagement legs 31 and 31, and a connection portion 32 which connects the engagement legs 31 and 31 together so as to be disposed near one ends of the engagement legs 31 and 31. The locking member 30 is formed in a U shape, one engagement leg 31 engages with the engagement groove 15 and the notch 16 on one side surface of the radial foil bearing 3, and the other engagement leg 31 engages with the engagement groove 15 and the notch 16 on the other side surface of the radial foil bearing 3. As shown in FIG. 2E, the length of the engagement leg 31 is approximately the same as a sum of the thickness of the bearing housing 12 and the thickness of the back foil piece 11a. Moreover, as shown in FIGS. 2C to 2E, the connection portion 32 is disposed between the valley portion 11b of the back foil piece 11a and the top foil 10.

In the locking member 30 having the above-described configuration, the engagement leg 31 engages with both of the engagement groove 15 of the bearing housing 12 and the notch 16 of the back foil piece 11a. Accordingly, the locking member 30 functions as a fixing device to fix the back foil piece 11a to the bearing housing 12. In addition, since the connection portion 32 is covered by the top foil 10, detachment of the locking member 30 from the back foil piece 11a is prevented. Accordingly, the locking member 30 securely fixes the back foil piece 11a to the bearing housing 12.

Moreover, as shown in FIG. 2B, the shape of the engagement leg 31 or the connection portion 32 of the locking member 30 may be a square pole shape, or may be a cylindrical shape (a round bar shape). Moreover, the thickness of the locking member is approximately 0.2 mm to 0.5 mm. For example, when the bearing size of the radial foil bearing 3 is (diameter) 35 mm×(length) 35 mm, the thicknesses of the back foil piece 11a and the top foil 10 are approximately 100 µm. In addition, the height of the peak portion 11c (the height with respect to the valley portion 11b) of the back foil piece 11a is approximately 0.5 mm. Accordingly, as shown in FIG. 2B, by setting the thickness of the locking member 30 to be less than 0.5 mm (approximately 0.2 mm to 0.5 mm), the connection portion 32 of the locking member 30 is disposed so as to be separated from the top foil 10 without contacting the top foil 10. That is, the locking member 30, the engagement leg 31, or the connection portion 32 does not interfere with the top foil 10.

For example, a metal foil which is composed of stainless steel or the like having a thickness less than 0.5 mm is formed into a U shape using etching processing, and thereby the locking member 30 can be formed. Moreover, the locking member 30 can also be formed by bending a wire-like metal bar having a thickness less than 0.5 mm.

As shown in FIG. 2A, the top foil 10 is configured so as to be wound in a cylindrical shape along the inner surface of the back foil 11 which is composed of three back foil pieces 11a. The top foil 10 is disposed so that the tip of the one end 10a engages with the groove 13 formed in the bearing housing 12. Moreover, a rectangular metal foil, in which a long side thereof is in a bearing circumferential direction and a short side thereof is in a bearing longitudinal direction, is wound in a cylindrical shape in the longitudinal direction (the bearing circumferential direction) of the long side, and thus, the top foil 10 is formed.

However, the top foil 10 is not wound so that both ends of the metal foil butt against each other, and is wound so that the one end 10a overlaps with the outside of the other side. In addition, the one end 10a is formed so as to extend out in a tangential direction at a predetermined position of a cylinder portion which is formed at the portion other than the overlapping portion.

Moreover, the groove 13 of the bearing housing 12 is formed so that the depth direction thereof corresponds to the extending direction of the one end 10a of the top foil 10.

Accordingly, the top foil 10 is disposed so that the extending direction of the one end 10a corresponds to the depth direction of the groove 13, and the tip of the one end 10a is engaged with the groove 13. Therefore, the top foil 10 is not deformed in the state where the one end 10a engages with the groove 13. Accordingly, distortion does not occur in the top foil 10.

Moreover, in the present embodiment, the one end 10a of the top foil 10 which engages with the groove 13 is fixed into the groove 13 by a male screw 17. That is, the male screw 17 is screwed and inserted into the hole 14, whereby the one end 10a is let to tightly contact the inner wall surface of the groove 13 and is fixed thereto. Moreover, deformation of the one end 10a due to tight contact with the inner wall surface of the groove 13 is slight. Accordingly, distortion of the top foil 10 due to the deformation of the one end hardly occurs.

In addition, in the top foil 10, a thin portion 18 is formed in each of the one end 10a and the other end opposite to the one end, wherein the thin portion 18 is thinner than an intermediate portion between the one end and the other end. The thin portions 18 are formed to be thinned to be in a state where the outer circumferential surfaces thereof (surfaces near the bump foil 11) are depressed further than the outer circumferential surface of the intermediate portion of the top foil 10.

The thin portions 18 are formed using, for example, etching processing in which both ends of the top foil 10 are formed into a desired thickness (thinness) while being controlled by the ten micrometers. Specifically, when a bearing diameter is set at 35 mm, if the thickness of the top foil 10 is set at 100 µm, the thin portions 18 are formed so that the thickness thereof is approximately 80 µm. In addition, compared to bending or the like, in the above etching processing, stress occurring in the top foil 10 is extremely small. Accordingly, distortion due to the processing hardly occurs in the top foil 10.

Moreover, a length in the circumferential direction of the thin portion 18 is a length corresponding to, for example, a distance from the groove 13 to one peak of the end of the bump foil 11 which are positioned in each of both sides of the groove 13.

By forming the thin portions 18 on both ends of the top foil 10, both ends (thin portions 18) are easily deformed elastically. Therefore, both ends (thin portions 18) become curved surfaces along the curved surfaces composing the inner circumferential surface of the bearing housing 12. Accordingly, a force (local preload) clamping the rotary shaft 1 hardly occurs even at both ends of the top foil 10.

That is, when one end (toe portion) of a top foil is fixed to a bearing housing using spot welding as in the related art, the vicinities of both ends (near the toe portion and near a free end) are not easily fit in a curved surface which composes the inner circumferential surface of the bearing housing and become states close to planes. Accordingly, a force (local preload) clamping a rotary shaft occurs in the above portions close to planes. As a result, disadvantages are caused in that starting torque is increased, heat generation during operation is increased to be a set value or higher, or the like. On the other hand, in the top foil 10 of the present embodiment, by forming the thin portions 18 on both ends of the top foil 10, as described above, the force (local preload) clamping the rotary shaft 1 hardly occurs.

In addition, the thin portions 18 are formed to be thinned to be in a state where the outer circumferential surfaces of both ends of the top foil 10 are depressed further than the outer circumferential surface of the intermediate portion. Accordingly, a gap is formed between the thin portion 18 and the back foil 11 supporting the outer circumferential surface of the top foil, that is, between the thin portion 18 and the one peak of the end of the back foil. Accordingly, in the thin portions 18, the occurrence of the force (local preload) clamping the rotary shaft 1 can be securely prevented.

Next, operations of the radial foil bearing 3 having the above-described configuration will be described.

In a state where the rotary shaft 1 stops, the top foil 10 is pressed onto the rotary shaft 1 by the back foil 11 (three back foil pieces 11a) and thus closely contacts the rotary shaft 1.

Moreover, in the present embodiment, both ends of the top foil 10 are the thin portions 18. Accordingly, the force (local preload) clamping the rotary shaft 1 hardly occurs in the thin portions 18.

In addition, as shown by an arrow P of FIG. 2A, if the rotary shaft 1 starts rotating in the direction of the arrow P, at first, the rotary shaft 1 is rotated at a low speed, and thereafter, is gradually accelerated and rotated at a high speed. As a result, as shown by an arrow Q of FIG. 2A, an ambient fluid is led from a space between the one end 10a of the top foil 10 and one end of the back foil piece 11a, and the ambient fluid flows into a space between the top foil 10 and the rotary shaft 1. Accordingly, a fluid lubricating film is formed between the top foil 10 and the rotary shaft 1.

Film pressure of the fluid lubricating film acts on the top foil 10 and presses the peak portions 11c of the back foil piece 11a contacting the top foil 10. As a result, the back foil piece 11a is pressed by the top foil 10, and thus, the peak portions 11c are spread out. Accordingly, the back foil pieces 11a move on the bearing housing 12 in the circumferential direction thereof.

That is, the back foil pieces 11a (back foil 11) elastically support the top foil 10. Accordingly, when the back foil pieces 11a (back foil 11) receive a load from the top foil 10, the back foil pieces 11a are deformed in the circumferential direction, and thus, the back foil pieces 11a accept the bending of the top foil 10 and support the top foil 10.

However, as shown in FIG. 2C, the engagement leg 31 of the locking member 30 is inserted into and engages with the notch 16 which is provided in the side circumferential edge of the back foil piece 11a, and the engagement leg functions as a rotation stopper between the back foil piece 11a and the bearing housing 12. Accordingly, each peak portion 11c of the back foil piece 11a is displaced (moves) in the circumferential direction relative to the notch 16 as a fixed point (fixed end), wherein the locking member 30 is locked into the notch 16. However, the center of the back foil piece 11a itself does not move from a fixed position.

Moreover, when the back foil piece 11a is deformed (moves) in the circumferential direction, the back foil piece is influenced by friction between the back foil and the bearing housing 12 or the top foil 10. Accordingly, both ends (that is, the vicinities of free ends) of the back foil piece 11a are easily deformed (easily move), but the vicinity of the fixed point (fixed end) is not easily deformed.

Therefore, there is a difference in supporting rigidity of the back foil piece 11a between the free end and the fixed end.

However, in the present embodiment, the notch 16 is formed in the circumferentially center portion of the back foil piece 11a, and the fixed point by the locking member 30 is set at the circumferentially center portion of the back foil piece 11a. Accordingly, a distance between the fixed end and the free end is shortened, and the difference in supporting rigidity between the free end and the fixed end is decreased. Moreover, in the present embodiment, the back foil 11 is divided into three back foil pieces 11a. Therefore, compared to a case where the back foil 11 is formed of a single foil, the distance between the fixed end and the free end is shortened, and the difference in supporting rigidity between the free end and the fixed end is decreased.

Moreover, when the rotary shaft 1 is rotated at a high speed, the locking member 30 restrains the movement in the axial direction of the back foil piece 11a. Accordingly, even when an unexpected impact or the like is applied, the back foil piece 11a is not detached from the bearing housing 12. In addition, the locking member 30 has a simple structure in which the locking member is only inserted into the engagement groove 15 and the notch 16. However, since the top foil 10 covers the connection portion 32 of the locking member 30 and functions as a retainer, the locking member 30 is not detached due to impact or the like.

Moreover, in a state until the fluid lubricating film is formed, solid friction is generated between the rotary shaft 1 and the top foil 10, and the solid friction becomes resistance at the time of starting. However, as described above, according to the radial foil bearing 3 in the present embodiment, the preload does not occur at both ends of the top foil 10, and the top foil 10 at the side into which the ambient fluid flows is the thin portion 18 and is flexible. Accordingly, an opening is easily formed between the top foil 10 and the rotary shaft 1, and if the rotary shaft 1 starts, the fluid lubricating film is formed early, and the rotary shaft 1 is rotated in a non-contact state with respect to the top foil 10.

In the radial foil bearing 3, using the locking member 30, each of the pair of engagement legs 31 is engaged with the notch 16 of the back foil piece 11a and the engagement groove 15 of the bearing housing 12. Accordingly, since the back foil piece 11a (back foil 11) is fixed to the bearing housing 12, the back foil piece 11a can be accommodated into and fixed to the bearing housing 12 without performing spot welding or bending with respect to the back foil piece 11a. Therefore, occurrence of distortion in the top foil 10 due to influences of spot welding of the back foil 11 (back foil piece 11a) or the distortion of the back foil 11 is prevented, and distortion in the top foil 10 can be sufficiently decreased. Accordingly, the radial foil bearing, which realizes the designed favorable performance with respect to the load capability or dynamic characteristics (rigidity and damping) of the bearing, can be obtained.

In addition, in the back foil 11, since the spot welding or the bending to induce distortion of the related art is unnecessary, difficulty of the manufacturing is decreased, and the manufacturing cost can be decreased. That is, since errors of assembly or variation in assembly due to welding defects is removed, efficiency percentage at the time of manufacturing is improved, and the manufacturing cost can be decreased. In addition, since a special bending is unnecessary in the back foil 11, the back foil 11 can be press-molded with high accuracy.

Moreover, since welding of the back foil 11 is unnecessary, the efficiency percentage at the time of manufacturing or the performance is not influenced by high or low quality of the welding. As a result, reproducibility of a non-defective product is increased, and thus, mass productivity is increased.

In addition, even in the case where the back foil 11 is divided into plural sections in the circumferential direction in order to improve the bearing performance of the radial foil bearing, compared to the fixation using the welding, the bearing can be manufactured by small man-hour. Accordingly, the manufacturing cost can be deceased.

Moreover, the back foil 11 is composed of three (the plurality of) back foil pieces 11a which are disposed in the circumferential direction of the top foil 10, and the notches 16 are formed in each of the back foil pieces 11a. Accordingly, the distance between the fixed end and the free end of the back foil piece 11a is shortened, and the difference in supporting rigidity between the free end and the fixed end is decreased. Therefore, the variation of the supporting rigidity in the entire back foil 11 can be decreased. Accordingly, uniform supporting rigidity and sliding characteristics in the entire back foil 11 can be obtained. As a result, the radial foil bearing, which has a large bearing load capability, a high bearing rigidity capability, and a high damping capability, can be obtained.

In addition, the notches 16 of the back foil piece 11a are formed in the circumferentially center portion of the back foil piece 11a. Accordingly, the distance between the fixed end and the free end of the back foil piece 11a is shortened, and the difference in supporting rigidity between the free end and the fixed end is further decreased. Therefore, the variation of the supporting rigidity in the entire back foil 11 can be further decreased. As a result, the radial foil bearing, which has a larger bearing load capability, a higher bearing rigidity capability, and a higher damping capability, can be obtained.

Moreover, the present invention is not limited to the above-described embodiment, and various modifications can be realized within a scope which does not depart from the gist of the present invention.

For example, in the present embodiment, the back foil 11 is composed of three back foil pieces 11a. However, the back foil 11 may be composed of a single metal foil formed in an approximately cylindrical shape. Moreover, when the back foil 11 is composed of a plurality of back foil pieces 11a, the back foil 11 may be composed of two or four or more back foil pieces 11a.

In addition, in the above embodiment, the notch 16 is formed in the circumferentially center portion of the back foil piece 11a and the locking member 30 is locked into the notch 16, whereby the formation location of the notch 16 becomes the fixed end (fixed point) of the back foil piece 11a. However, similar to the related art, the notch 16 may be formed on the end of the back foil piece 11a. Similarly, even when the back foil 11 is composed of a single foil, the notch 16 may be formed on the end of the back foil 11.

Figure 3:
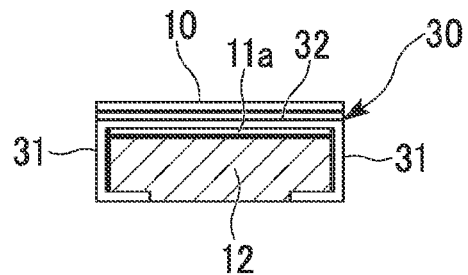
FIG. 3 is a view showing a modification of a locking member according to the present invention.

In addition, with respect to the locking member 30, the length of the engagement leg 31 is formed to be sufficiently longer than the sum of the thickness of the bearing housing 12 and the thickness of the back foil piece 11a, and as shown in FIG. 3, the tip of the engagement leg 31 may be bent onto the outer circumferential surface of the bearing housing 12. Accordingly, the back foil piece 11a (back foil 11) can be more strongly fixed to the bearing housing 12.

Figure 4A:
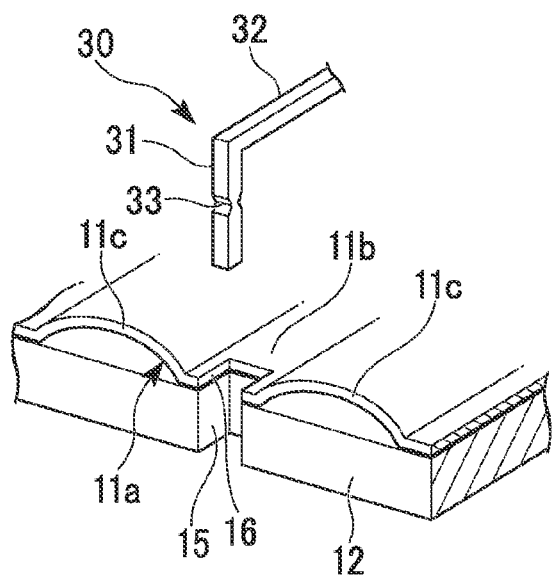
FIG. 4A is a perspective view showing a main section of the radial foil bearing according to the present invention.
Figure 4B:
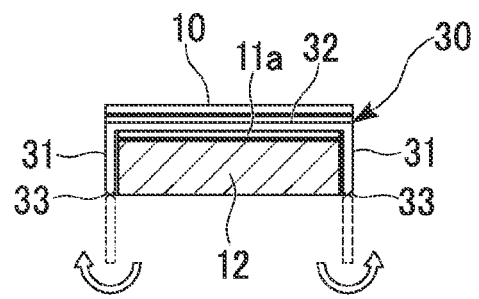
FIG. 4B is a view to explain an attachment method of a locking member according to the present invention.

In addition, as shown in FIG. 4A, with respect to the locking member 30, the length of the engagement leg 31 is formed to be sufficiently longer than the sum of the thickness of the bearing housing 12 and the thickness of the back foil piece 11a, and a depression (fold) 33 may be formed at a position corresponding to the sum of the thickness of the bearing housing 12 and the thickness of the back foil piece 11a. In order to fix the back foil piece 11a (back foil 11) to the bearing housing 12 by the locking member 30, similar to the embodiment shown in FIGS. 2A to 2E, the engagement legs 31 are engaged with the notches 16 and the engagement grooves 15, and the connection portion 32 is let to contact the valley portion 11b of the back foil piece 11a. Thereafter, the engagement leg 31 is bent at the position of the depression 33 and is broken at the position, the tip portion of the engagement leg is removed, and thus, as shown in FIG. 4B, the locking member 30 is locked in the same state as in FIG. 2E and is fixed.

However, in this example, after the engagement legs 31 are engaged with the notches 16 and the engagement grooves 15, the tip portions of the engagement legs 31 are pulled downward, and the pulled state is maintained during a predetermined time. By indirectly pulling the back foil piece 11a (back foil 11) to the bearing housing 12, the back foil piece 11a can be fitted into the inner circumferential surface of the bearing housing 12. Accordingly, the shape of the back foil piece 11a can be changed into an approximately arc shape along the inner circumferential surface of the bearing housing 12.

Moreover, in the above embodiment, the one end 10a of the top foil 10 is engaged with the groove 13 formed in the bearing housing 12 without fixing the top foil 10 by welding, and thus the top foil 10 is accommodated into and fixed to the bearing housing 12. However, the fixation of the top foil 10 may be optionally performed using welding or the like.

INDUSTRIAL APPLICABILITY

According to a radial foil bearing of the present invention, a radial foil bearing can be obtained, which decreases distortion occurring in a back foil and a top foil, realizes the designed favorable performance with respect to a load capability or dynamic characteristics (rigidity and damping) of the bearing, and decreases the manufacturing cost.

REFERENCE SIGNS LIST 1 rotary shaft
3 radial foil bearing
10 top foil
11 back foil (bump foil)
11a back foil piece
11b valley portion
11c peak portion
12 bearing housing
15 engagement groove
16 notch
30 locking member
31 engagement leg
32 connection portion

The invention claimed is:

1. A radial foil bearing for supporting a rotary shaft by being externally attached to the rotary shaft, the radial foil bearing comprising:
   a cylindrical top foil disposed so as to face the rotary shaft;
   a back foil disposed on a radially outer side of the top foil; and
   a cylindrical bearing housing accommodating the top foil and the back foil in a state of inserting the top foil and the back foil thereinto,
   wherein engagement grooves are formed on both side surfaces of the bearing housing so as to extend from an outer circumferential edge to an inner circumferential edge of the bearing housing,
   wherein notches are formed in circumferential edges on both sides of the back foil, and
   wherein a locking member is locked into the engagement grooves of the bearing housing and the notches of the back foil, and includes a pair of engagement legs engaging with the engagement grooves and the notches, and a connection portion connecting the engagement legs together so as to be disposed near one ends of the engagement legs.

2. The radial foil bearing according to claim 1,
   wherein the notches of the back foil are formed in a circumferentially center portion of the back foil.

3. The radial foil bearing according to claim 1,
   wherein the back foil is configured to include back foil pieces disposed in a circumferential direction of the top foil, and
   wherein the notches are formed in each of the back foil pieces, and the engagement legs of the locking member engage with the notches.

4. The radial foil bearing according to claim 3,
   wherein the notches of each back foil piece are formed in a circumferentially center portion of each back foil piece.

5. The radial foil bearing according to claim 1,
   wherein the back foil is a wave-like sheet in which valley portions contacting the bearing housing and peak portions contacting the top foil are alternately formed in a circumferential direction of the bearing housing,
   wherein the notches of the back foil are formed in the valley portions, and
   wherein the connection portion is disposed between the top foil and the back foil.

6. The radial foil bearing according to claim 5,
   wherein the notches of the back foil are formed in a circumferentially center portion of the back foil.

7. The radial foil bearing according to claim 5,
   wherein the back foil is configured to include back foil pieces disposed in a circumferential direction of the top foil, and
   wherein the notches are formed in each of the back foil pieces, and the engagement legs of the locking member engage with the notches.

8. The radial foil bearing according to claim 7, wherein the notches of each back foil piece are formed in a circumferentially center portion of each back foil piece.

* * * * *